Dec. 12, 1944.  R. L. ARCHER  2,364,610

METHOD OF MAKING TAPERED SHEET-METAL BLANKS

Filed Feb. 4, 1942  3 Sheets-Sheet 1

INVENTOR.
RICHARD L. ARCHER

BY Fay, Macklin, Golrick
Williams, Chilton and Isler
ATTORNEYS.

Dec. 12, 1944.    R. L. ARCHER    2,364,610
METHOD OF MAKING TAPERED SHEET-METAL BLANKS
Filed Feb. 4, 1942    3 Sheets-Sheet 2
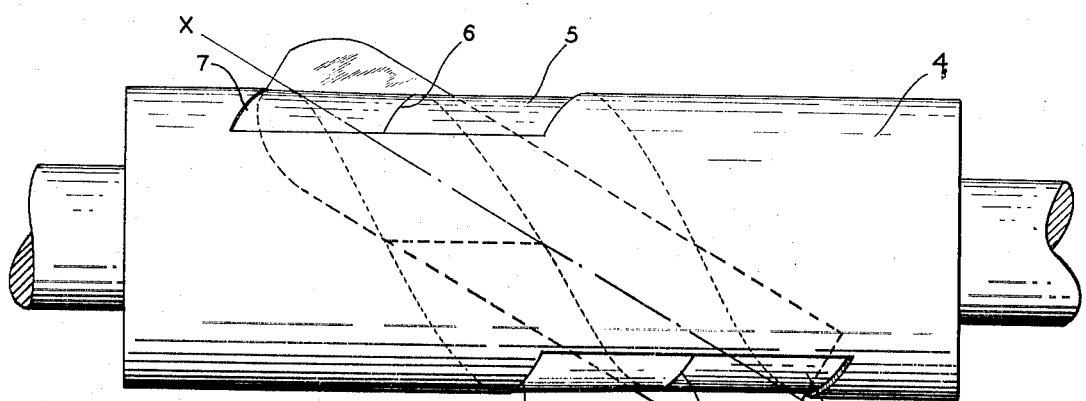
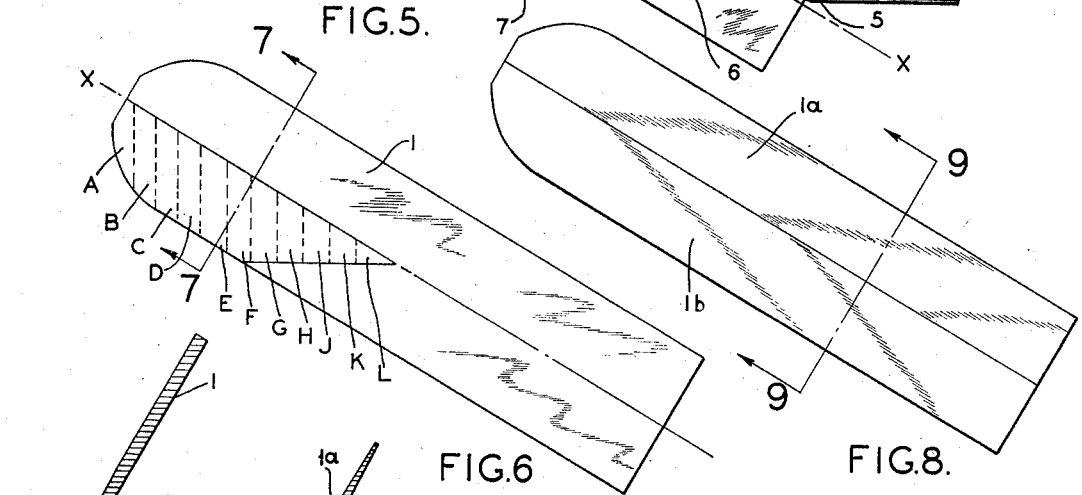
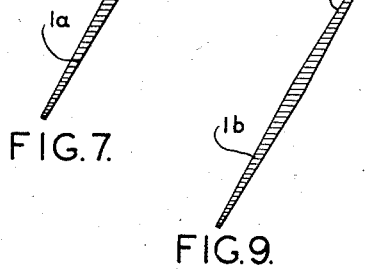
INVENTOR.
RICHARD L. ARCHER
BY Fay, Macklin, Golrick
Williams, Chilton and Isler.
ATTORNEYS Dec. 12, 1944. R. L. ARCHER 2,364,610
METHOD OF MAKING TAPERED SHEET-METAL BLANKS
Filed Feb. 4, 1942 3 Sheets-Sheet 3
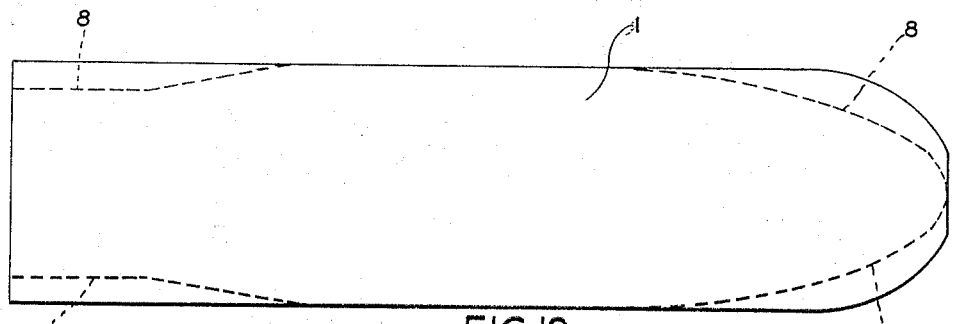
FIG.10.
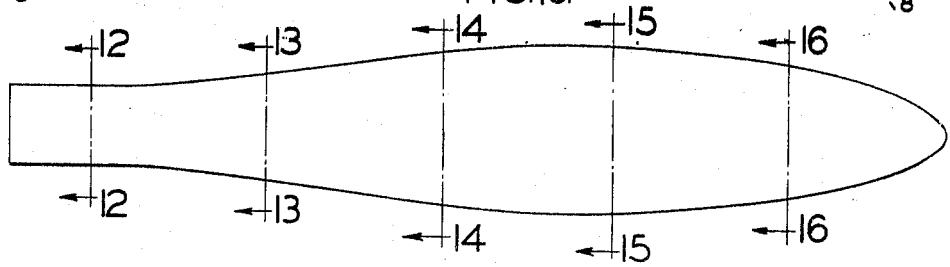
FIG.11.
   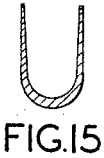 
FIG.12. FIG.13. FIG.14. FIG.15. FIG.16.
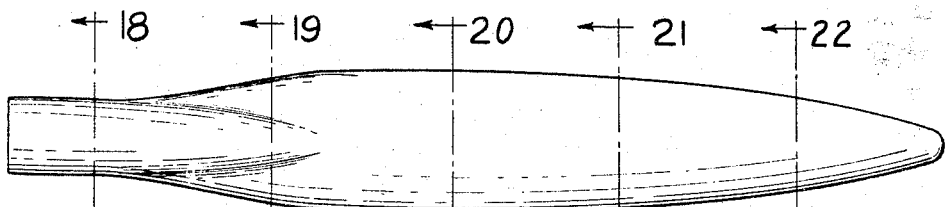
FIG.17.
    
FIG.18. FIG.19. FIG.20. FIG.21. FIG.22.
INVENTOR.
RICHARD L. ARCHER
BY
ATTORNEYS Patented Dec. 12, 1944

2,364,610

UNITED STATES PATENT OFFICE 2,364,610

METHOD OF MAKING TAPERED SHEET-METAL BLANKS

Richard L. Archer, Bratenahl, Ohio, assignor to The Mid-West Forge Company, Cleveland, Ohio, a corporation of Ohio Application February 4, 1942, Serial No. 429,536

1 Claim. (Cl. 80—60)

This invention relates, as indicated, to a method of making a tapered sheet metal blank, but has reference more particularly to the making of a blank which is especially useful for manufacture into propeller blades for aeroplanes and the like, but which may be used for other purposes.

In making propeller blades, for example, it is highly desirable to design and proportion the blade to have sufficient strength, but with a minimum weight of the blade. This is usually accomplished by providing the maximum thickness of metal in the leading edge of the blade and a lesser thickness of metal rearwardly of such edges. Various methods have heretofore been used to produce a blade of such a design, but most of these methods involve the use of seamless tubing and various machining or grinding operations for removing excess metal after the tubing has been shaped to the approximate form of a propeller blade.

While the desirability of adhering to a design that would reduce weight to a minimum has been well recognized among propeller blade manufacturers, it has heretofore been difficult to produce such blades in commercially desirable quantities by existing methods of manufacture.

It is a primary object of the present invention to provide a method whereby a blank suitable for use in making propeller blades of the aforesaid design can be produced rapidly and in quantities sufficient to supply all existing demands.

Another object of the invention is to provide a method of making a blank of the aforesaid character, which method is characterized by a series of die rolling operations.

To the accomplishment of the foregoing and related ends, said invention, then, consists of the means hereinafter fully described and particularly pointed out in the claim; the annexed drawings and the following description setting forth in detail certain means embodying the invention, such means constituting, however, but one of various mechanical forms in which the principle of the invention may be used.

Fig. 5 is a top plan view of the rolls shown in Fig. 3;

Fig. 6 is a plan view of the blank as it appears at the stage of rolling shown in Figs. 3, 4 and 5;

Fig. 7 is a transverse cross-sectional view of the blank, taken on the line 7—7 of Fig. 6;

Fig. 8 is a plan view of a completed blank;

Fig. 9 is a transverse cross-sectional view of the blank, taken on the line 9—9 of Fig. 8;

Fig. 10 is a plan view of a completed blank, with indications, in dotted lines, of a forming operation adapting the blank for use in making a propeller blade;

Fig. 11 is a side elevation of the blank as partially formed into a propeller blade;

Figs. 12, 13, 14, 15 and 16 are transverse cross-sectional views, taken on the lines 12—12, 13—13, 14—14, 15—15 and 16—16 respectively, of Fig. 11;

Fig. 17 is a view of the blank of Fig. 11 in a fully collapsed condition;

Figs. 18, 19, 20, 21 and 22, are transverse cross-sectional views, taken on the lines 18—18, 19—19, 20—20, 21—21 and 22—22, respectively, of Fig. 17.

The method, generally speaking, consists in providing a sheet metal blank of substantially uniform thickness, and then tapering said blank laterally by rolling the blank by increments beginning at one end of the blank and progressing toward the other end of the blank. The rolling is preferably accomplished by movement of the blank through die rolls, the blank during said movement being at an acute angle to the line of contact between the rolls.

Figure 1:
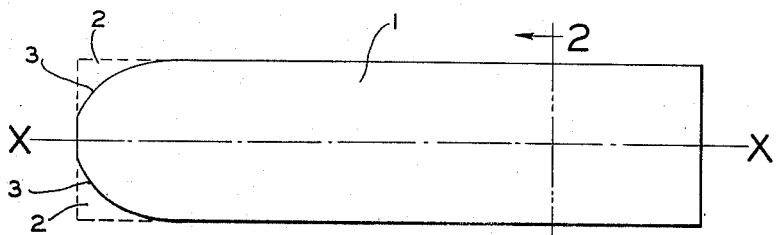
Fig. 1 is a plan view of a sheet metal blank from which the novel blank of the present invention may be formed.
Figure 2:
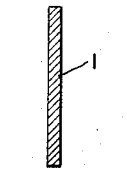
Fig. 2 is a transverse cross-sectional view of the blank, taken on the line 2—2 of Fig. 1.

Referring more particularly to Figs. 1 and 2, there is disclosed a sheet metal blank 1, of generally rectangular form, having a long axis designated by the line X—X, and of substantially uniform thickness throughout. This blank is preferably formed by cutting metal or sheet strip into suitable lengths, and removing the corners at one end of the blank, indicated by the numeral 2, from such lengths, so as to leave rounded edges 3.

Figure 3:
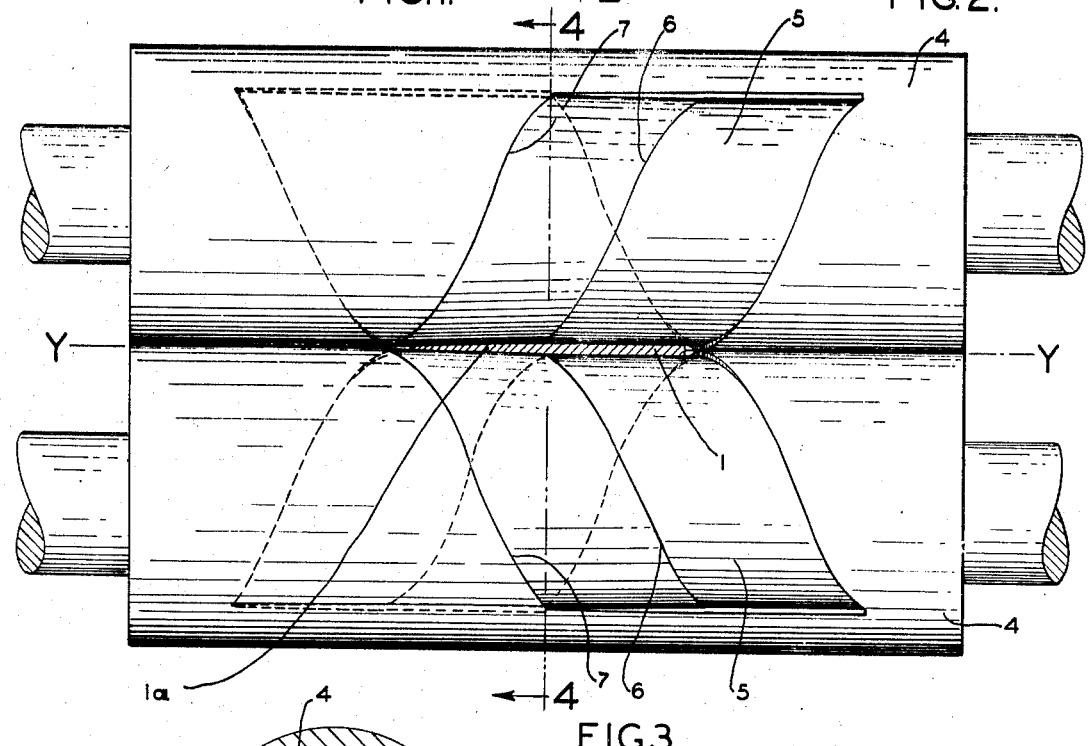
Fig. 3 is an elevational view of a pair of die rolls which may be used for forming the tapered blank, and showing a blank approximately halfway through the rolls.

The blank is then subjected to a series of die rolling operations so as to provide a blank, such as shown in Figs. 8 and 9, in which the cross-section of the blank varies from a maximum along the central longitudinal portion of the blank to a minimum along the edges thereof, this shaping of the blank being preferably accomplished by means of suitable die rolling apparatus, consisting in this case, of a pair of rolls 4 having complementary die recesses 5 therein, which recesses extend spirally about the rolls. Approximately half of each of these recesses, i. e., the halves extending to the right of the center line 6, as viewed in Fig. 3, are of substantially uniform depth, this depth being approximately half the thickness of the blank 1. The other half of each recess 5, i. e., the halves extending to the left of the center line 6, as viewed in Fig. 3, are of gradually diminishing depth, that is to say, they diminish in depth in a direction parallel with the axes of the rolls from a maximum at the center line 6 of the rolls, which maximum is the same as the depth of the recesses to the right of this center line, to a minimum, as indicated by the lines 7, the lines 7 preferably being at the uncut peripheral surface of the rolls.

Figure 4:
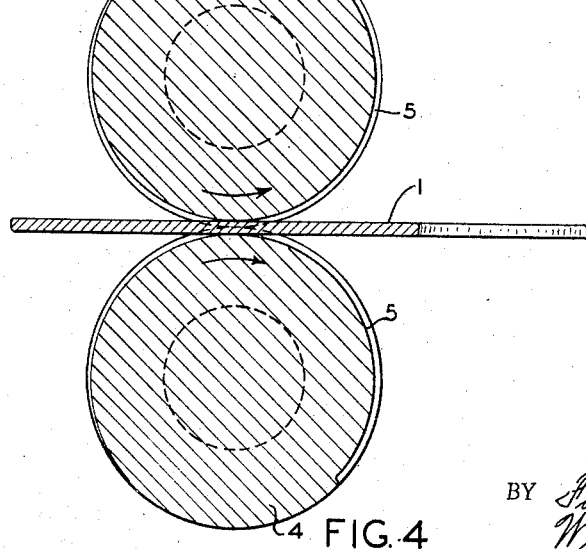
Fig. 4 is a cross-sectional view, taken on the line 4—4 of Fig. 3.

In the first rolling operation, the blank of Figs. 1 and 2 is fed into and through the rolls in the manner shown in Figs. 3, 4 and 5, that is to say, the blank is moved into and through the rolls in a direction normal to the line of contact between the rolls, indicated by the line Y—Y in Fig. 3, but with the longitudinal center line or axis X—X thereof at an acute angle to said line of contact. An angle of not more than 25° or 30° to said line of contact has been found desirable in most cases. Since the portions of the recesses of the rolls 5 to the right of the center line 6 have a combined depth equal to the thickness of the blank, the portion of the blank to the right of the axis X—X as viewed in Fig. 5, will remain unaffected or unacted upon by the rolls. On the other hand, the portions of the recesses 4 of the rolls to the left of the center line 6, exert pressure on the portion of the blank to the left of the axis X—X, as viewed in Fig. 5, and since these latter portions of the recesses are of gradually diminishing depth, as previously explained, a taper, such as shown in Figs. 3, 6 and 7, will be imparted to this latter portion of the blank.

The pressure of the portions of the recesses 5 to the left of the center line 6 is exerted on only a very small portion of the blank at any given instant, this portion of the blank being that immediately at and adjacent to the normal line of contact Y—Y between the rolls. Considered in the aggregate, however, the blank is rolled by successive increments, indicated by the areas A, B, C, D, E, F, G, H, J, K and L, beginning at one end of the blank and progressing to the other end of the blank, each of such areas extending from substantially the line X—X to the lateral edge of the blank. Since each of these areas is relatively short, as compared with the total or overall length of the blank, it has been found that the tapering can be accomplished with relatively small rolling pressures, so that relatively small rolls may be used, and the use of heavy and cumbersome rolling equipment thereby obviated.

Following the aforesaid operation, the blank is inverted, and again passed through the rolls 4 in the same manner as it was passed through the rolls in the first operation. In the second operation, however, the tapered portion of the blank, indicated by reference numeral 1a, in Fig. 7, will pass through the portions of the recesses 5 which are of uniform depth while the untapered portions of the blank will pass through those portions of the recesses 5 which are of diminishing depth, so as to provide the taper, indicated by the reference numeral 1b in Figs. 8 and 9.

It will be understood, of course, that the desired shaping or tapering of the blank is not necessarily secured by means of a single set of rolls, and that after the tapering operation in the first set of rolls, additional tapering operations may be required in other sets of rolls, in which the recesses are shallower and wider.

Moreover, in providing a blank which is to be made into a propeller blade, it is desirable that the blank, prior to the aforesaid rolling operations, be given a longitudinal taper, varying from a maximum at the hub end of the blank, to a minimum at the tip end of the blank. Such a preliminary operation is contemplated by the present invention, it being understood, however, that when such a longitudinally-tapered blank is provided, suitable modifications will be made in the design of the recesses in the rolls to accommodate such a blank.

Since the metal of the blank may vary in hardness and in its plastic deformation properties, the blank may emerge from the rolls with a wavy or irregular edge. This necessitates trimming of the edges to a predetermined contour, as indicated, for example, by the dotted lines 8 in Fig. 10.

A blank, as thus formed, is adapted for various uses, but is especially adapted for forming into a propeller blade for aeroplanes and the like. For this purpose the blank is first folded or bent to the channel shape, shown in Figs. 11 to 16 inclusive, as by means of a suitable bending brake. The channel shaped blank thus formed is then laid on its side, and by means of suitable dies, not shown, is collapsed in such a manner as to assume the shape shown in Figs. 17 to 22 inclusive. Thereafter, the edges of the blank may be welded together, as indicated by the reference numeral 9 in Figs. 18 to 22 inclusive. The forming of the tapered blank into a propeller, as indicated in Figs. 11 to 16 inclusive, do not, however, constitute a part of my invention.

Other modes of applying the principle of my invention may be employed instead of the one explained, change being made as regards the means herein disclosed, provided the means stated by any of the following claims or the equivalent of such stated means be employed.

I therefore particularly point out and distinctly claim as my invention:

In a method of making a sheet metal blank having laterally tapered portions, the steps which consist in providing an elongated blank of predetermined contour and substantially uniform thickness, then shaping only one portion of said blank in die rolls which engage the blank across substantially the entire width thereof to provide a blank having a taper from the longitudinal center line thereof toward the edge of the shaped portion, the blank being disposed with its longitudinal center line in engagement with the die rolls and at an acute angle to the line of contact between the rolls during said rolling and then inverting the blank and repeating the operation to provide a blank tapering from its longitudinal center line toward both edges thereof.

RICHARD L. ARCHER.